(12) United States Patent
Inoue et al.

(10) Patent No.: US 6,427,116 B2
(45) Date of Patent: Jul. 30, 2002

(54) NAVIGATION SYSTEM (75) Inventors: Koichi Inoue; Shigeru Tateishi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/810,242

(22) Filed: Mar. 19, 2001

Related U.S. Application Data (63) Continuation of application No. PCT/JP99/04383, filed on Aug. 12, 1999.

(51) Int. Cl.7 .................................................. G06F 7/00
(52) U.S. Cl. ........................ 701/208; 340/991; 701/213
(58) Field of Search ................................ 701/200, 205, 701/206, 207, 208, 209, 213; 340/905, 990, 991

(56) References Cited

FOREIGN PATENT DOCUMENTS

| JP | 62162171 | 7/1987 |
|----|----------|--------|
| JP | 5113750 | 5/1993 |
| JP | A793696 | 4/1995 |
| JP | 8261774 | 10/1996 |
| JP | A1056449 | 2/1998 |

*Primary Examiner*—William A. Cuchlinski, Jr.
*Assistant Examiner*—Edward Pipala

(57) ABSTRACT

A navigation apparatus has an information taking-in means for taking-in road-in-facility information, which indicates roads placed in a facility and is supplied from the outside, and a displaying means for displaying a location map according to the road-in-facility information read out from the information taking-in means and for-navigation location map data read out from a storing means and displaying a position of a driver's car and a guiding route on the location map.

10 Claims, 6 Drawing Sheets

START
↓
A SEARCH IN CASE OF A CONNECTING POINT DENOTING A DESTINATION (CONVENTIONAL SEARCH) ~ ST1
↓
A SEARCH OF ROADS OF A FACILITY ~ ST2
↓
THE COMBINATION OF RETRIEVAL RESULTS ~ ST3
↓
END

FIG.9A

| NUMBER | MESH NUMBER | LINK NUMBER IN MESH |
|---|---|---|
| 1 | 5 | 100 |
| 2 | 5 | 105 |
| .... | .... | .... |
| n | 8 | 47 |
| End | | |

FIG.9B

| NUMBER | MESH NUMBER | LINK NUMBER |
|---|---|---|
| 1 | 5 | 100 |
| 2 | 5 | 105 |
| .... | .... | .... |
| n | 8 | 47 |
| n+1 | 99999 (INDICATES AN EXTERNAL MESH) | 3 |
| n+2 | 99999 | 12 |
| End | | |

| NUMBER | NAME | DATA CONTENTS | | | |
|---|---|---|---|---|---|
| 1 | REFERENCE CO-ORDINATES | LATITUDE OF REFERENCE POINT | LONGITUDE OF REFERENCE POINT | SIZE IN X (Y) DIRECTION[*1] | |
| 2 | CONNECTING POINT | NORMALIZED CO-ORDINATE X | NORMALIZED CO-ORDINATE Y | | |
| 3 | NODE DATA | THE NUMBER OF NODES | | | |
| | | NORMALIZED CO-ORDINATE X | NORMALIZED CO-ORDINATE Y | WEIGHT 1[*2] | WEIGHT 2[*3] |
| | | . . . | . . . | . . . | . . . |
| 4 | CONNECTION INFORMATION | THE NUMBER OF CONNECTION INFORMATION | | | |
| | | NODE NUMBER 1 | NODE NUMBER 2 | NODE NUMBER 3 | END OF RECORD |
| | | . . . | . . . | . . . | |

[*1]: A SIZE OF ONE SIDE OF A RECTANGULAR AREA IN WHICH ROAD DATA IS DEFINED
[*2]: A WEIGHT OF EACH NODE FOR A DESTINATION
[*3]: A WEIGHT OF EACH NODE FOR A CONNECTING POINT

FIG.12

NAVIGATION SYSTEM

CROSS-REFERENCE TO The RELATED APPLICATION

This application is a continuation of International Application No. PCT/JP99/04383, whose International filing date is Aug. 12, 1999, the disclosure of which is incorporated by reference herein.

BACKGROUND OF THE INVENTION

1. Field of the Invention

The present invention relates to a navigation system in which a route search is performed by using a navigation function and a road placed in a facility of a private land is connected to a retrieved route to perform a door-to-door route guidance.

2. Description of Related Art

Figure 1:
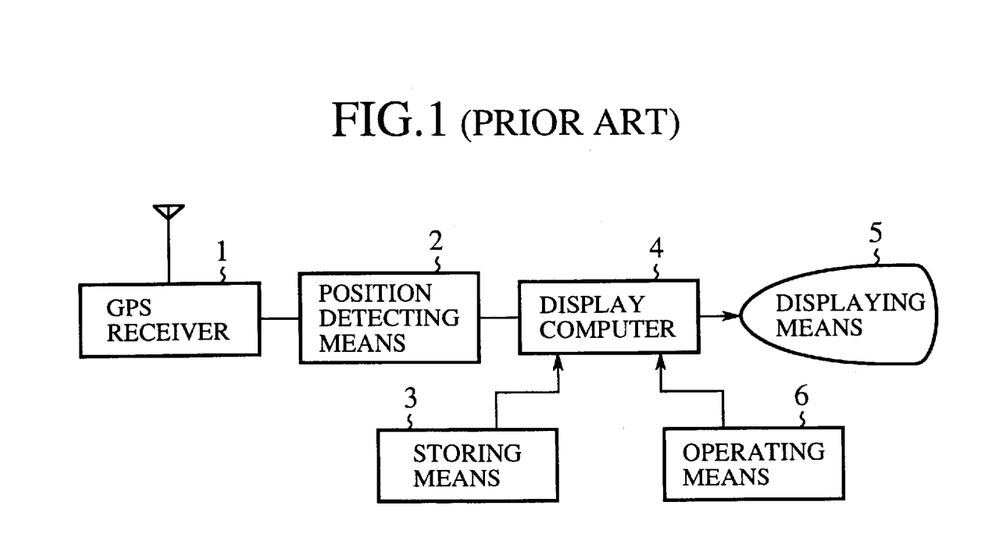
FIG. 1 is a block diagram showing the configuration of a conventional navigation apparatus.

FIG. 1 shows a conventional navigation apparatus, for example, disclosed in the Published Unexamined Japanese Patent Application H7-93696 (1995). In FIG. 1, 1 indicates a global positioning system (GPS) receiver for receiving electric wave from a GPS satellite. Reference numeral 2 indicates a position detecting means for detecting a position of a driver's car. Reference numeral 3 indicates a storing means, comprising a CD-ROM or the like, for storing for-navigation location map data. Reference numeral 4 indicates a display computer for displaying a specific piece of location map data read out from the storing unit 3 on a display means 5 which comprises a liquid crystal display (LCD) or the like. A current position of the driver's car is included in the specific piece of location map data. Reference numeral 6 indicates an operating means comprising a cursor moving key or the like.

Next, operation of the navigation apparatus illustrated in FIG. 1 is described.

Electric wave transmitted from the GPS satellite is received in the GPS receiver 1, a current position of the driver's car is detected in the position detecting means 2 in which the received electric wave is received, a specific piece of location map data, in which the current position of the driver's car is included, is selected from the for-navigation location map data stored in advance in the storing unit 3 and is read out by the display computer 4, and a location map indicated by the specific piece of location map data is displayed on the displaying means 5 with a prescribed mark indicating the current position of the driver's car.

To perform a route guidance to each of a plurality of destinations, a destination setting list, in which both a location map code allocated to a location map of a peripheral area of one destination and coordinates of the destination in the location map are included, is stored in the storing means 3 for each of the destinations. When a desired destination is set by a driver who operates the operating means 6, the destination setting list of the desired destination is read out from the storing means 3 in the display computer 4, location map data corresponding to the location map code of the destination setting list is read out from the storing means 3 in the display computer 4, a location map indicated by the location map data is displayed on the displaying means 5, a guiding route to the desired destination is determined in the display computer 4 according to the read-out location map data, and the guiding route is displayed in the location map displayed on the displaying means 5.

Figure 2:
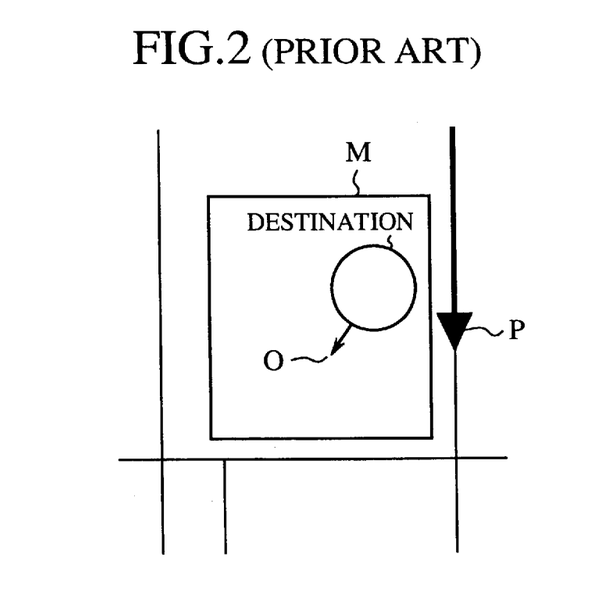
FIG. 2 is an explanatory diagram of a route guided by the conventional navigation apparatus.

Because the conventional navigation map has the above configuration, information, which indicates roads placed in each facility and is obtained according to the destination search, is only composed of pieces of point information such as latitudes and longitudes. In this case, a driver is not guided to any road other than roads (that is, public roads respectively having a width wider than a prescribed width) of the location map data stored in the storing means 3. Therefore, as shown in FIG. 2, the driver is guided to only a position P of a public road nearest to a destination O placed in a facility M, and a driver's car is moved from this final guided position P to the destination 0 of the facility M according to the driver's judgment. Therefore, in cases where an entrance I of the facility M, which has a large area, is placed far away from the final guided position P, it is difficult to reach the entrance I and to reach the destination 0 of the facility M.

Also, because there is usually no location map for driving the car in private land with a large area, it is impossible to correct the position of the driver's car according to a map matching with a location map of the private land. Thus there is a problem that positional precision for the driver s car is low. Also, in cases where all roads of a facility are indicated by road-in-facility data, a large volume of road-in-facility data is required. Therefore, there is another problem that it is not proper in practice to use the road-in-facility data.

SUMMARY OF THE INVENTION

The present invention is provided to solve the above problems, and an object of the present invention is to provide a navigation apparatus in which the search calculation of a guiding route to roads placed in a facility in private land is performed to guide a car to a door of a building of the facility or to guide a car to a recommended parking position of the facility and in which a map matching is possible in the driving of the car in the private land, which has a comparatively wide site, to improve positional precision of the driver's car.

A navigation apparatus according to the present invention comprises a GPS receiver for receiving electric wave from a GPS satellite, a position detecting means for detecting a position of a driver's car according to the received electric wave output from the GPS receiver, a storing means for storing for-navigation location map data, an information taking-in means for taking-in facility information which indicates roads placed in a facility and is supplied from the outside, and a displaying means for displaying a location map according to the facility information read out from the information taking-in means and the for-navigation location map data read out from the storing means and displaying the position of the driver's car detected in the position detecting means and a guiding route on the location map.

Therefore, a search calculation for a guiding route to roads placed in a facility in private land can be performed, and a guidance to a door of a building placed in the facility or a guidance to a recommended parking position placed in the facility can be performed. Also, a map matching with a location map of the facility can be performed in the driving of the car in private land which has a comparatively wide site, and positional precision of the driver's car can be improved.

In a navigation apparatus according to the present invention, the facility information, which indicates the roads placed in the facility, is taken in the information taking-in means through a communication means.

Therefore, it is not required to make unnecessary increases to the capacity of the storing, means.

In a navigation apparatus according to the present invention, the facility information, which indicates the roads placed in the facility, is taken in the information taking-in means from a storage medium.

Therefore, it is not required to make unnecessary increases to the capacity of the storing means.

In a navigation apparatus according to the present invention, the facility information, which indicates the roads placed in the facility and is taken in the information taking-in means, is enciphered.

Therefore, an illicit use of the facility information, which is not open to the public, can be prevented.

In a navigation apparatus according to the present invention, the facility information includes a weighted value in a route from a destination placed in the facility to each of nodes, and a shortest route to the destination is calculated by comparing the weighted values of the nodes.

Therefore, because only one type of additional information denoting the weighted values of the nodes is included in the facility information, an amount of data can be reduced. Also, a shortest route can be calculated by only comparing the weighted values of the nodes, and it is not required to perform a complicated calculation. Also, the weighted value in a route from a connecting point to each node is registered in advance, so that a route calculation for a driver's return can be performed in the same manner.

DETAILED DESCRIPTION OF THE PREFERRED EMBODIMENTS

The invention will now be described with reference to the accompanying drawings.
Embodiment 1

Figure 3:
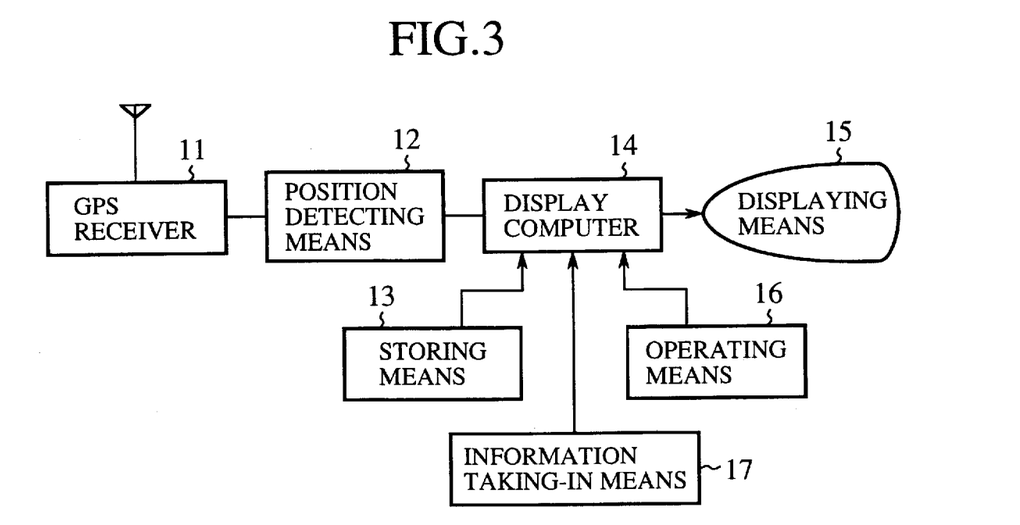
FIG. 3 is a block diagram showing the configuration of a navigation apparatus according to the present invention.

FIG. 3 is a block diagram showing a schematic configuration of a navigation apparatus according to a first embodiment of the present invention. In FIG. 3, 11 indicates a global positioning system (GPS) receiver for receiving an electric wave from a GPS satellite. Reference numeral 12 indicates a position detecting means for detecting a position of a driver's car. Reference numeral 13 indicates a storing means, made of a CD-ROM or the like, for storing for-navigation location map data. Reference numeral 14 indicates a display computer for displaying a specific piece of location map data read out from the storing unit 13 on a display means 15 which is made of a liquid crystal display (LCD) or the like. A current position of the driver's car is included in the specific piece of location map data. Reference numeral 16 indicates an operating means made of a cursor moving key or the like. Reference numeral 17 indicates an information taking-in means for taking-in road-in-facility information which indicates roads placed in a facility and is supplied from the outside.

Figure 4:
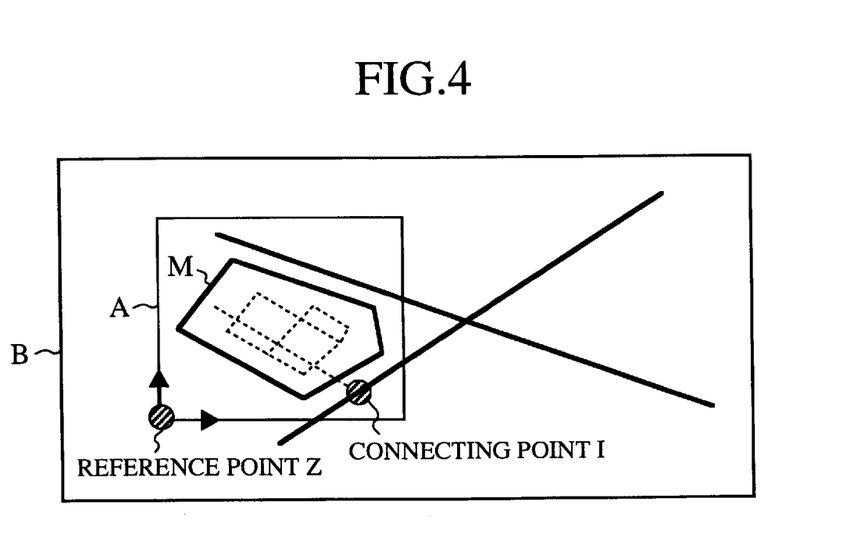
FIG. 4 is an explanatory diagram of a route guided by the navigation apparatus of the present invention.

As shown in FIG. 4, the road-in-facility information is defined and prepared in a rectangular area in which a reference point Z is set as an original point of a local co-ordinate system. A connecting point (that is, an entrance of a facility) I with a main road is included in the road-in-facility information. A set of latitude/longitude of the connecting point I is calculated from a set of latitude/longitude of the reference point Z, and a position of the connecting point I in map data stored in a CD-ROM is calculated. Here, in FIG. 4, a sign A indicates a data preparing range of external road data, and a sign B indicates a search range of road links to calculate the connecting point I.

[Calculation Method of Connecting Point]

① Method of Calculating a Mesh Number of the Map Data from the Latitude/Longitude and Calculating Normalized Co-ordinates of a Mesh Normally, map data included in a CD-ROM is divided into pieces of map data of a plurality of rectangular areas, and co-ordinates of the map data in each rectangular area are normalized in a range from 0 to 1 and are stored. Therefore, in cases where the co-ordinates of one piece of map data are projected on another piece of map data, it is required to calculate a mesh number and normalized co-ordinates of the piece of map data.

For example, in cases where mesh sizes in the X-axis and Y-axis are set to 7.5' and 5.0' respectively, a method of calculating a mesh number of the map data, which includes a latitude $\theta$ and a longitude $\lambda$ and is placed in the lowest layer, is as follows.

$$\text{Mesh-}X = (\text{latitude } \theta - \text{reference latitude of map})/7.5'$$

$$\text{Mesh-}Y = (\text{longitude } \lambda - \text{reference longitude of map})/5.0'$$

Also, a method of calculating normalized co-ordinates X and Y of map data of each mesh is as follows.

$$X = (\text{latitude } \theta - \text{reference latitude of Mesh-}X)/7.5'$$

$$Y = (\text{longitude } \lambda - \text{reference longitude of Mesh-}Y)/5.0'$$

Figure 5:
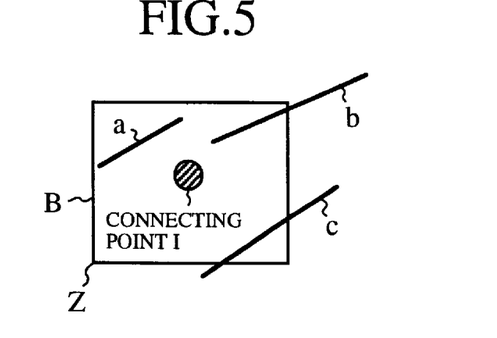
FIG. 5 is an explanatory diagram showing the preparation of a link list.

② Also, the Connecting Point is Projected on a Link (or Road) of a Map, and a Method of Retrieving the Link is as Follows (a) As shown in FIG. 5, a search area B including the connecting point I is set, and to-be-searched link lists "a" and "b" are selected. Here, a sign "c" indicates a not-to-be-searched link list.

Figure 6:
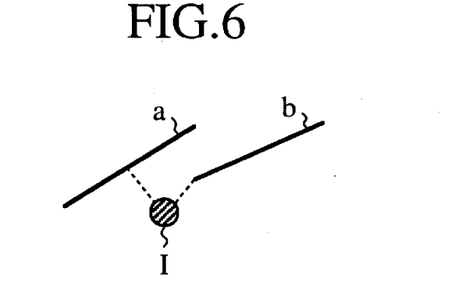
FIG. 6 is an explanatory diagram showing a shortest connection between a link and a connecting point.

(b) A distance between each of the to-be-searched link lists a and b selected in the item (a) and the connecting point I is calculated. That is, as shown in FIG. 6, in cases where it is possible to construct a line perpendicular to the to-be-searched link list "a" from the connecting point I, a distance from the connecting point I to an intersection point of the perpendicular line and the to-be-searched link list "a" is calculated.

Also, in cases where it is impossible to construct a line perpendicular to the to-be-searched link list "b" from the connecting point I, a shortest distance from the connecting point I to an end point of the to-be-searched link list "b" is calculated. A link relating to a distance, which is shortest-among the calculated distances, is set as a connecting link, a point of the connecting link, at which a distance from the connecting point I is shortest, is set as a virtual node, and the virtual node is newly prepared in software. Thereafter, the connecting point I is replaced with the virtual node each time the virtual node is newly prepared.

Next, an operation of Embodiment 1 is described.

Electric waves transmitted from the GPS satellite are received in the GPS receiver 11, a current position of the driver's car is detected in the position detecting means 12 in which the received electric wave is received, a specific piece of location map data, in which the current position of the driver's car is included, is selected from the for-navigation location map data stored in advance in the storing unit 13 and is read out by the display computer 14, and a location map indicated by the specific piece of location map data is displayed on the displaying means 15 with a prescribed mark indicating the current position of the driver's car.

Figure 7:
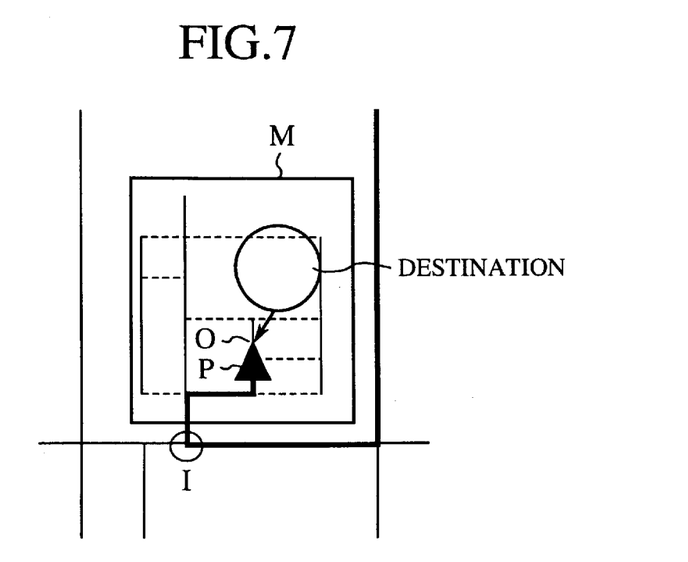
FIG. 7 is an explanatory diagram showing a searching operation performed in cases where information of roads placed in a facility is used.
Figure 8:
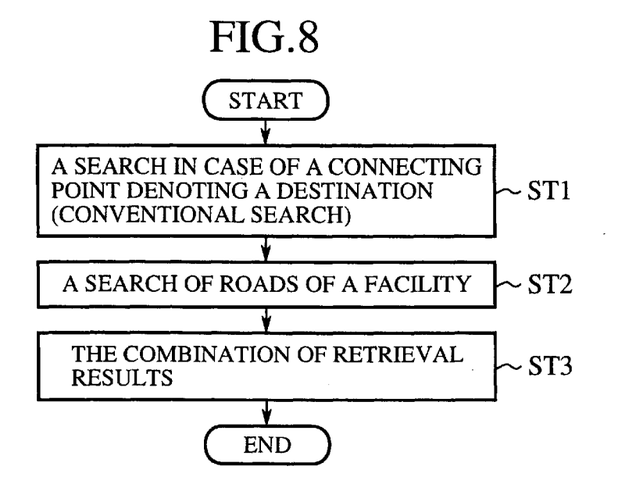
FIG. 8 is a flow chart explaining the searching operation.
Figure 9A:
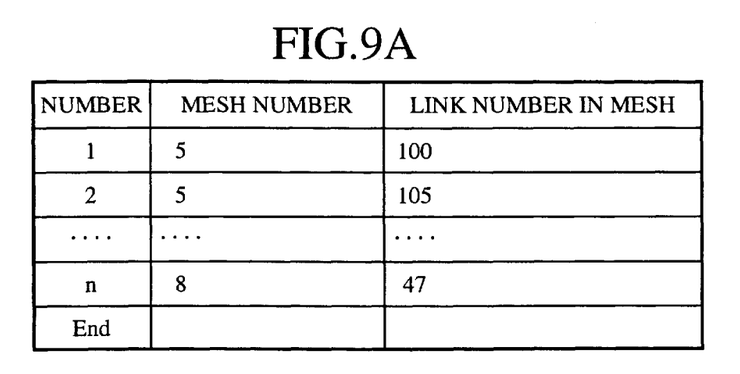
FIG. 9(a) is a table diagram showing a result of the retrieval of a destination (facility entrance)

To perform a route guidance to each of a plurality of destinations, a destination setting list, in which both a location map code allocated to a location map of a peripheral area of one destination and co-ordinates of the destination in the location map are included, is stored in the storing means 13 for each of the destinations. When a desired destination is set by a driver operating the operating means 16, the destination setting list of the desired destination is read out from the storing means 13 in the display computer 14, location map data corresponding to the location map code of the destination setting list is read out from the storing means 13 in the display computer 14, a location map indicated by the location map data is displayed on the displaying means 15, a guiding route to the desired destination is determined in the display computer 14 according to the read-out location map data, and the guiding route is displayed in the location map displayed on the displaying means 15. The above-described processing is the same as that in the prior art. However, in the present invention, because the road-in-facility information supplied from the outside is taken in the information taking-in means 17, as shown in FIG. 7, the guiding route to the entrance of the facility, which denotes the connecting point I, is retrieved and determined. The above-described operation denotes a search processing operation of a step ST1 shown in a flow chart of FIG. 8, and FIG. 9A is a table showing the retrieval result.

Thereafter, in the present invention, because the road-in-facility information supplied from the outside is taken in the information taking-in means 17, the procedure proceeds to both the search of roads placed in the facility and a guidance to one road. Initially, in the method ② of calculating the connecting point I, a virtual node, with which the connecting point I is to be replaced, is prepared.

Figure 10:
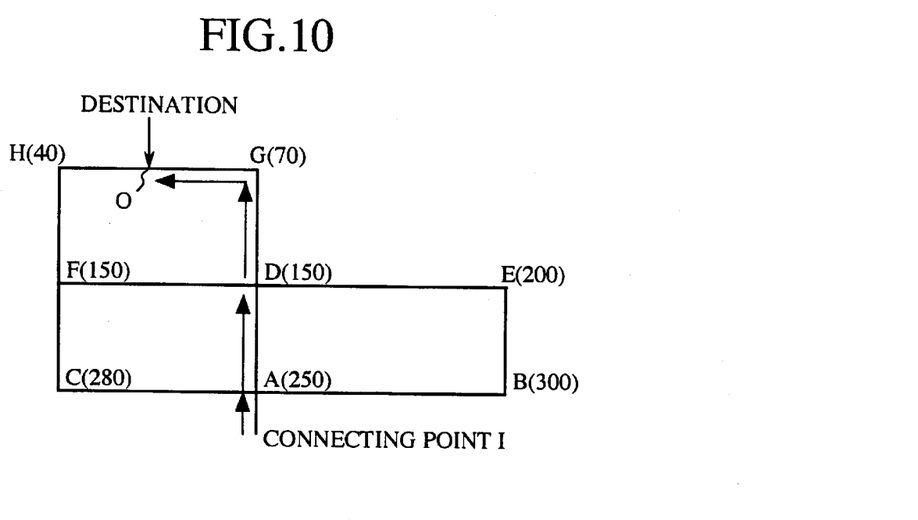
FIG. 10 is an explanatory diagram showing a searching method performed in cases where the information of roads placed in the facility is used.

Also, as shown in FIG. 10, because a destination O placed in the facility is determined in advance in the information registration, a weighted value (a value indicated in each set of parentheses of FIG. 10) in a route from the destination to each node is calculated in advance as the road-in-facility information and is stored. In this case, a minimum value among candidates for the weighted value of each node is stored as a weighted value of the node.

That is, in cases where the road-in-facility information'supplied from the outside is taken in the information taking-in means 17,2 it is advantageous in the data transfer time to set an amount of data as small as possible. In contrast, to perform the route search, various types of attribute data are usually required, so that an amount of data becomes enormous. Also, required information depends on a searching algorithm. Though there is a method in which a type of road data supplied from the outside is altered to another type to match the road data with the searching algorithm, a large amount of information converting processing is required.

Figure 11:
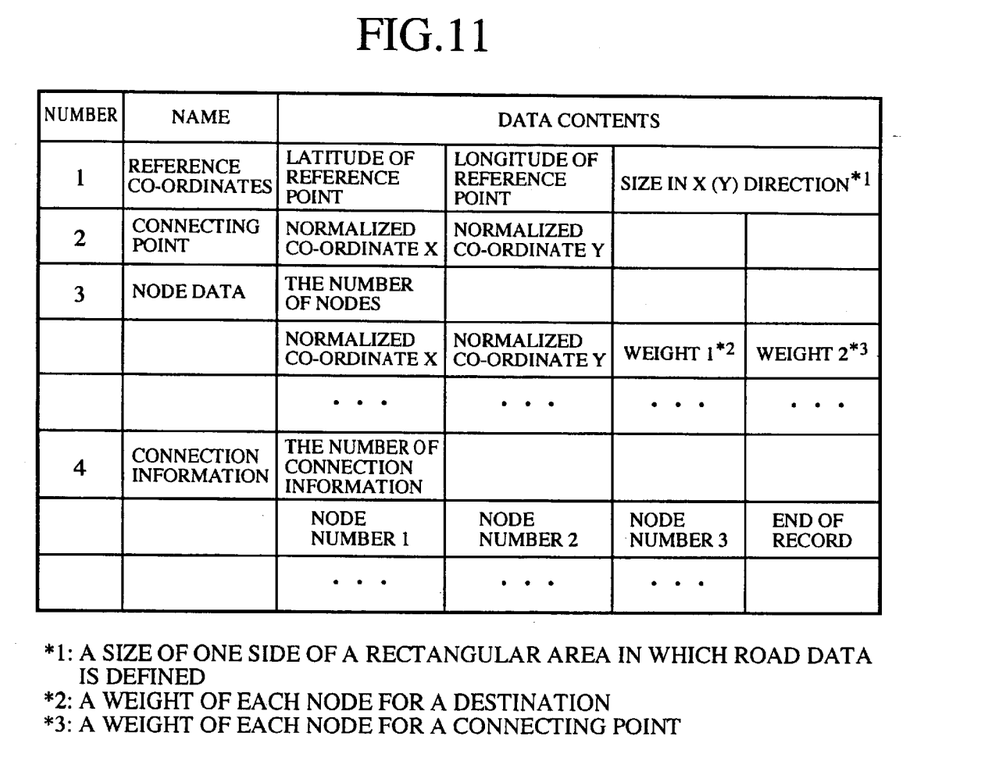
FIG. 11 is a diagram showing a format of the information of roads placed in the facility.

Therefore, as is described above, an amount of information required for the route search can be minimized by including the weighted value of each node in the road-in-facility information. Also, a search function for the road-in-facility information can be added by adding a simple processing of a search logic (step ST2). FIG. 11 shows a format of the road-in-facility information.

Figure 9B:
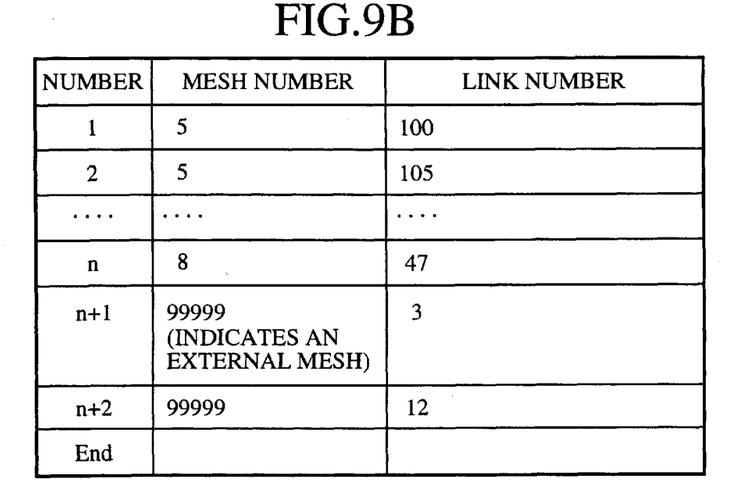
FIG. 9(b) is a table diagram showing a result of the retrieval of another destination placed in a facility.

Thereafter, the retrieval result, in which the connecting point I retrieved in the step ST1 in the same manner as in the prior art is set as the destination, is combined with the retrieval result in which roads placed in the facility are retrieved in the step ST2, and a guiding route to a destination placed in the facility is retrieved (step ST3). A retrieval result is shown in FIG. 9B.

As is described above, in the first embodiment, an amount of information can be reduced. That is, in the information normally used, various types of information indicating directions, suspension of traffic, road widths, road types are additionally included as well as information of point co-ordinates and connection information, these types of information are synthetically considered, and the weighted value of each node is determined in the execution of the search calculation. However, in the present invention, because the weight calculation is performed in advance, only one type of information indicating weighted values of nodes is included as additional information in the road-in-facility information. Accordingly, an amount of information can be reduced.

Also, in the normal search, no node is weighted, but each link is weighted. Thereafter, all patterns possible as a route to the destination are searched, and one route pattern, in which a sum of weighted values of links is minimized, is set as an optimum route. Therefore, to calculate the sum for each of all candidates for the route to the destination in cases where roads exist in the netlike arrangement, a complicated logic is required, and a memory capacity required for the calculation using the complicated logic is enlarged. In contrast, in the present invention, in cases where a weighted value is allocated to each node, the weighted values of all nodes respectively connected with a node are compared with each other in the real route search calculation, and one node having the minimum weighted value among those of the nodes is selected one after another. Therefore, this type of calculation requires simple logic, and a capacity of a memory to be used can be made small.

Embodiment 2

Because the road-in-facility information used in the first embodiment denotes information of roads placed in a private facility, it is not desirable to make the road-in-facility information public. Therefore, a facility's owner requires to encipher the-road-in-facility information and to provide the ciphered road-in-facility information for users. This requirement is satisfied in a navigation system shown in FIG. 12 according to a second embodiment.

Figure 12:
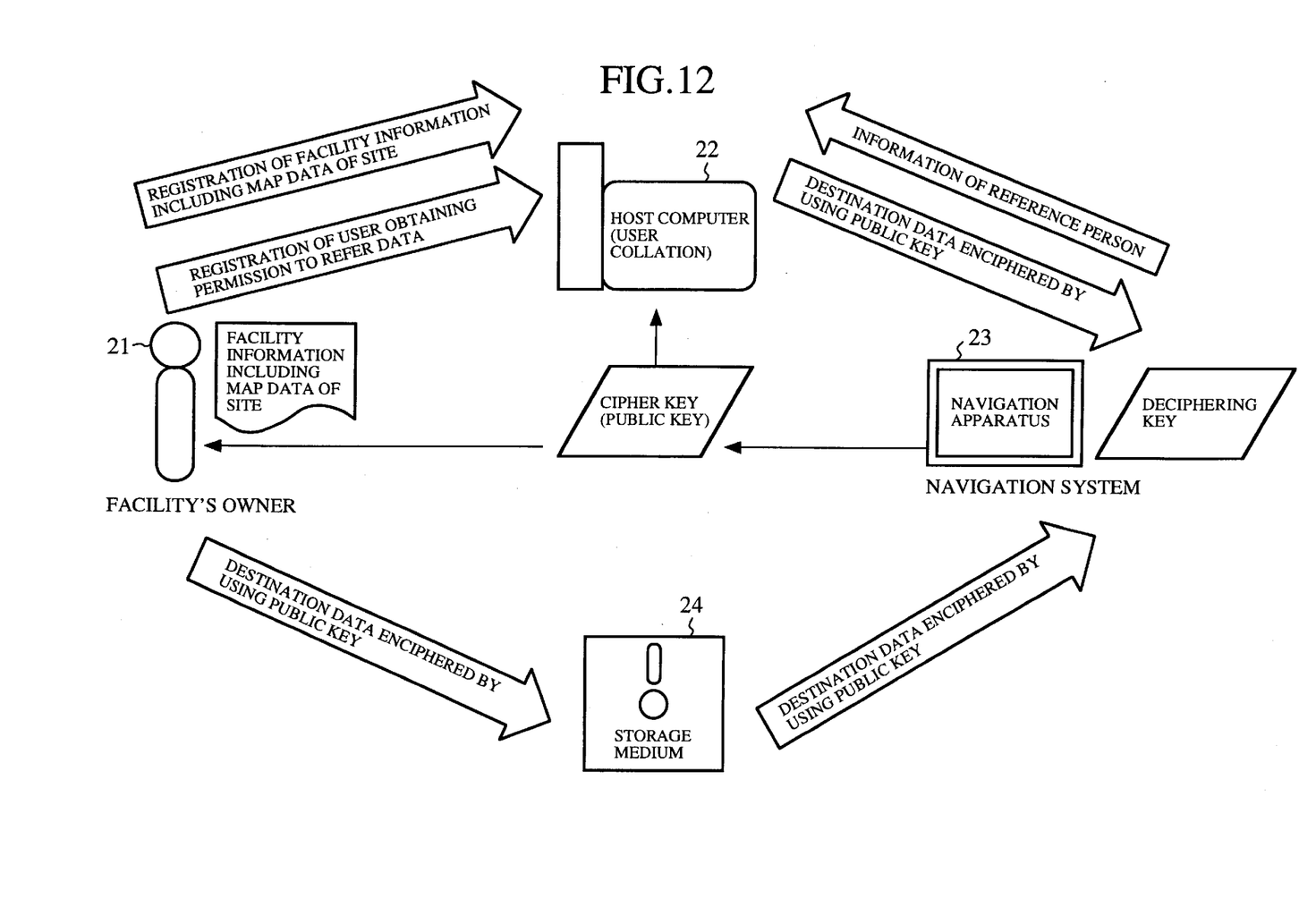
FIG. 12 is an explanatory diagram showing the configuration of a navigation system in which ciphered information of roads placed in a facility is applied for a route guidance.

In FIG. 12, 21 indicates a facility's owner. Reference numeral 22 indicates a host computer for enciphering the road-in-facility information supplied from the facility's owner 21 by using a cipher key (or a public key) and outputting ciphered road-in-facility information. Reference numeral 23 indicates a navigation apparatus possessed by a person who is permitted by the facility's owner 21 to use the ciphered road-in-facility information and has a deciphering key. Reference numeral 24 indicates a storage medium for storing the ciphered road-in-facility information which is enciphered according to a request of the facility's owner 21.

Next, an operation of Embodiment 2 is described.

In cases where the host computer 22 is used, a user, who desires to use the road-in-facility information, obtains permission of the facility's owner 21 in advance to use the road-in-facility information, and the facility's owner 21 informs the host computer 22 that the facility's owner 21 gives permission to the user. Thereafter, when a person makes a request to the host computer 22 to allow the person to use the road-in-facility information, it is judged in the host computer 22 whether or not the person agrees with the user who obtains permission of the facility's owner 21 to use the road-in-facility information. In cases where the person agrees with the user who obtains permission of the facility's owner 21, the ciphered road-in-facility information is sent from the host computer 22 to the navigation apparatus 23 of the user. Thereafter, the user deciphers the ciphered road-in-facility information by using the deciphering key, and the user uses the deciphered road-in-facility information.

In contrast, in cases where a user does not receive or transmit information from/to the host computer 22, the user receives the storage medium 24, in which the ciphered road-in-facility information is stored, from the facility's owner 21. Thereafter, the user inserts the storage medium 24 into the navigation apparatus 23 of the user to read out the ciphered road-in-facility information, the user deciphers the ciphered road-in-facility information by using the deciphering key, and the user uses the deciphered road-in-facility information.

As is described above, in the second embodiment, the road-in-facility information is enciphered, and the ciphered road-in-facility information is provided for the user. Accordingly, it is possible to ensure prevention of the leaking-out of a secret of the facility, and a guiding route can be retrieved even in the facility grounds.

As is described above, because the road-in-facility information is used to retrieve a guiding route, a map matching can be, for example, performed for roads of a facility such as a factory or a public facility, and the navigation apparatus according to the present invention is appropriate to a door-to-door route search.

What is claimed is:

1. A navigation apparatus, comprising:
   a GPS receiver for receiving a signal from a GPS satellite;
   a position detecting means for detecting a position of a driver's car according to the signal received by the GPS receiver;
   a storing means for storing for-navigation location map data;
   an information input means for inputting facility information which indicates roads of a facility, said information input means inputting said facility information from an external source; and
   a displaying means for displaying a location map according to the facility information from the information input means and the for-navigation location map data from the storing means and displaying the position of the driver's car detected in the position detecting means and a guiding route on the location map.

2. A navigation apparatus according to claim 1, wherein the facility information, which indicates the roads of the facility, is input by the information input means via a communication means.

3. A navigation apparatus according to claim 1, wherein the facility information, which indicates the roads of the facility, is input by the information input means via a storage medium.

4. A navigation apparatus according to claim 1, wherein the facility information, which indicates the roads of the facility and is input by the information input means, is enciphered.

5. A navigation apparatus according to claim 1, wherein the facility information includes a weighted value in a route from a destination of the facility to each of a plurality of nodes, and a shortest route to the destination is calculated by comparing the weighted values of the nodes.

6. A method for navigating a vehicle comprising:
   detecting a position of the vehicle according to a signal received from a GPS satellite;
   storing for-navigation location map data;
   receiving facility information indicating roads of a facility, the facility information being supplied from an external source; and
   displaying a location map according to the received facility information and the stored for-navigation location map data, displaying the detected position of the car, and displaying a guiding route on the displayed location map.

7. The method according to claim 6, wherein the facility information is supplied via a communication means.

8. The method according to claim 6, wherein the facility information is supplied via an external storage medium.

9. The method according to claim 6, wherein the facility information is enciphered.

10. The method according to claim 6, wherein the facility information further includes a weighted value in a route from a destination of the facility to each of a plurality of nodes and the method further comprises calculating a shortest route to the destination by comparing the weighted values associated with each of the nodes.

* * * * *